United States Patent [19]

Burrus

[11] 4,151,856

[45] May 1, 1979

[54] FLUID PRESSURE RELAY AND OUTPUT BOOSTER

[75] Inventor: Billy S. Burrus, Tulsa, Okla.

[73] Assignee: Combustion Engineering, Inc., Windsor, Conn.

[21] Appl. No.: 841,497

[22] Filed: Oct. 11, 1977

[51] Int. Cl.[2] .............................................. G05D 16/00

[52] U.S. Cl. .......................................... 137/84; 137/85

[58] Field of Search ............. 137/84, 85, 116.3, 116.5, 137/596, 596.14, 596.2, 627.5

[56] References Cited

U.S. PATENT DOCUMENTS

| | | | |
|---|---|---|---|
| 2,800,913 | 7/1957 | Swartwort | 137/84 |
| 2,880,705 | 4/1959 | Schneider | 137/84 X |
| 3,371,686 | 3/1968 | Bueler | 137/627.5 X |
| 3,536,089 | 10/1970 | Sarback | 137/116.3 |

*Primary Examiner*—Alan Cohan
*Attorney, Agent, or Firm*—Arthur L. Wade

[57] ABSTRACT

A primary element is connected to a control element of a first fluid pressure relay to move the element to positions at which pressure fluid outputs of relatively small volumes will be generated to represent the element positions. The pressure fluid outputs of the first relay are directed to the input of a second relay which generates pressure values for pressure fluid which are proportional to the first relay outputs in, and at, relatively larger volumes of the pressure fluid.

3 Claims, 4 Drawing Figures

FLUID PRESSURE RELAY AND OUTPUT BOOSTER

BACKGROUND OF THE INVENTION

1. Field of the Invention

The present invention relates to a fluid pressure relay system which generates an output of large volumes of pressure fluid at pressures representative of positions of a primary element over a predetermined range. More specifically, the invention relates to the type of fluid pressure relay system with an output chamber valved between a fluid pressure supply and exhaust to generate fluid pressures with a relatively large volume of pressure fluid representative of the positions of a primary element and having substantially no bleed of supply pressure fluid to exhaust when the primary element system relays are at their steady state conditions.

2. Description of the Prior Art

The fluid pressure relay has been extensively developed in the prior art. My active participation in this development is evidenced by my U.S. Pat. No. 3,840,044, issued Oct. 8, 1974 and U.S. Pat. No. 4,052,996, issued Oct. 11, 1977. However, the developers of the prior art have not produced one of these simple fluid pressure relays without excessive reaction force on the primary element and with substantially no wastage from the fluid pressure source at steady state conditions and with a large volume of pressure fluid as an output. The art is rampant with claims for relays that will provide these functions. However, I have found no relays which justify these claims.

SUMMARY OF THE INVENTION

A primary object of the invention is to provide a fluid pressure relay system including a first three-way valve whose plug element is positioned by a primary element in relation to seats at a movable wall to regulate the supply of fluid pressure in relatively small volumes to a control chamber and exhaust of fluid pressure from the control chamber representative of the positions of the primary element, and a second three-way valve responsive to the output control chamber of a first valve to move the plug element of the second valve in relation to seats at a movable wall to regulate the common fluid pressure supply and exhaust to its control chamber in substantially larger volumes.

Another object is to relate the plug elements to their seats so that, with steady state conditions at any position of the primary element within its predetermined range, there will be substantially no continuous exhaust of pressure fluid from the supply.

The invention contemplates a system including two fluid pressure relays. The first of the relays is within a housing having a bore divided into two chambers by a movable wall sealed to the bore sides. The movable wall has a bore extending between the two chambers, with a seat about the bore faced toward a first of the chambers. A plug element is spring-urged toward the seat from the direction of the first chamber. A second spring is positioned to urge the movable wall, and its seat, toward the plug element. A source of pressure fluid is connected to the first chamber and is valved into the second chamber across the bore seat in the movable wall. A hollow tubular element is connected to be moved by a primary element and is sealed to, and extended through, the housing wall and into the bore to alternately connect the second chamber to exhaust through its passage and unseat the plug element, while sealing the exhaust passage, to connect the source of fluid pressure to the second chamber. The second of the relays is within a second housing with a bore also divided into two chambers by a movable wall sealed to the bore sides. A first of the second relay chambers is connected to the output second chamber of the first relay. The movable wall is connected to position a hollow tubular member through which the second chamber of the second relay is connected to exhaust and with which a spring-urged plug element is actuated to alternatively connect the second chamber to the supply pressure. The fluid pressure developed in the second chamber of the second relay, at the system output, is proportional to the fluid pressure developed in the second chamber of the first relay and pressure fluid of this output is in much greater volume than the pressure fluid flowed into the output chamber of the first relay.

The invention further contemplates that, in the arrangement of parts in the relay system, the primary element moves to initiate changes in the fluid pressure within the output second chamber of the first relay with relatively small volumes of pressure fluid. If the primary element advances the attached hollow tubular element toward the plug element, the plug element unseats to flow pressure fluid to the second chamber until the pressure adds enough force to that force of the spring to move the dividing wall and its seat into reengagement with the plug element. If the primary element withdraws the hollow tubular element from its engagement with the plug element, the second chamber is connected to exhaust through the tubular element until the pressure subtracts enough of its force from the spring force to move the wall and its seated plug element into re-engagement with the plug element. Upon both re-engagements, and no further movement of the primary element, the output chamber is positively sealed from the fluid pressure supply and exhaust. The pressure in the output second chamber of the first relay is connected to the input first chamber of the second relay. The movable wall of the second relay responds to an increasing pressure output of the first relay to move its attached tubular member against, and to unseat, the plug element to valve pressure fluid from the supply into the second chamber of the second relay. If the pressure in the second chamber develops to a value higher than the pressure in the first chamber, the attached tubular member is withdrawn from contact with the plug element so the plug element seals the supply of fluid pressure from the second chamber and connects the second chamber to exhaust through the tubular chamber. The fluid pressure developed in the second chamber is adjusted to a value proportional to the fluid pressure established in the second chamber of the first relay, and the volume of the pressure fluid from the second chamber of the second relay is substantially greater than the volume of pressure fluid from the second chamber of the first relay.

Other objects, advantages, and features of this invention will become apparent to one skilled in the art upon consideration of the written specificiations, appended claims, and attached drawings, wherein;

DESCRIPTION OF THE PREFERRED EMBODIMENT

Figure 1:
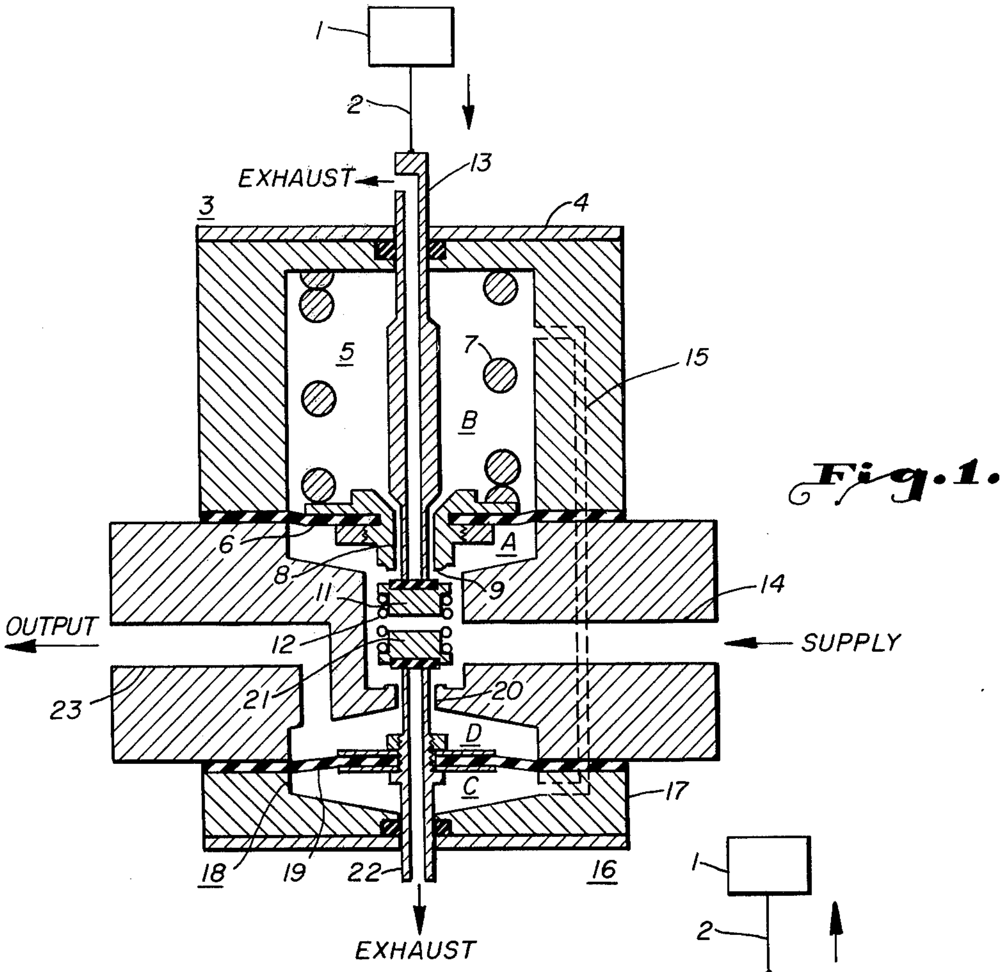
FIG. 1 is a sectioned elevation of a fluid pressure relay system in which the invention is embodied as connected to a primary element to increase its output pressure.

The first three Figures disclose the same form for the fluid pressure relay system connected to primary element 1 which is disclosed in the form of a "black box." The primary element takes positions within a range representative of variables to which it is directly exposed. No present purpose would be served by disclosing primary element 1 in detail, or the linkage 2 between the primary lement and relay system.

FIRST RELAY 3

First relay 3 of the system is within housing 4. This housing may be given many variations in form, but all forms must include the equivalent of bore 5. Bore 5 does not have to be cylindrical, although, in this art, that would be the preferred form.

Bore 5 is sealed at each end by the walls of the housing structure and is divided into two chambers, A and B, by movable wall 6. A spring 7 is mounted in chamber B to urge wall 6 in one direction. Bore 8, through wall 6, has a seat 9 facing toward chamber A. Plug element 11 is urged by spring 12, both in chamber A, toward seat 9. Tubular element 13 is extended from linkage 2 through the housing 4 wall of chamber B and down through wall bore 8 to engage plug element 11 with its open end.

A source of fluid pressure supply is connected to chamber A by housing passage 14. Pressures generated in chamber B are transmitted by housing passage 15 to a second relay which may be termed a "booster" relay.

FIG. 1 discloses the first relay as it is actuated by the primary element to unseat plug element 11 from seat 9. The pressure of the source connected to chamber A is thereby opened to chamber B across seat 9. The fluid pressure will then increase in chamber B until it adds enough force to that of spring 7 to move wall 6, and its seat 9, toward plug 11 to reseat plug 11 on seat 9. At the new position of tubular element 13-primary element 1, the output of chamber B has the higher fluid pressure value which represents that position.

SECOND RELAY 16

Housing passage 15 can be traced as it connects chamber B of first relay 3 to chamber C of second relay 16. Relay 16 may be described as within a part of housing 4. However, the choice is deliberate to describe the second relay 16 as within a separate housing 17. It is admitted that both relays could be described as within a single housing with a common fluid pressure supply for passage 14. However, although this arrangement provides compact use of the same supply and sharing of the chamber A, each of the three-way valves, or relays, will have their identity maintained separately to emphasize that the first relay generates an output fluid pressure with a relatively small volume of pressure fluid and feeds this generated output to the second relay to, in turn, generate a fluid pressure proportional in magnitude to the first relay output and with a relatively large volume of pressure fluid. Again, the first relay will quickly develop a control pressure, but with such a small volume of pressure fluid that it is inadequate to quickly actuate control devices requiring large volumes of pressure fluid as motive power. The second relay is required to quickly produce the fluid pressure output, representative of the position of primary element 1, with the relatively large volume of pressure fluid required to actuate control devices.

The second relay 16 has chamber C formed by dividing bore 18 with a diaphram 19 which then functions as a movable wall between chamber C and chamber D. Bore 18 is continued in passage 20 which connects chamber D with chamber A . Plug element 21 is positioned in chamber A and also urged by spring 12 toward the seat about passage 20. It is this plug element which is unseated to valve the supply of fluid pressure into chamber D just as plug 11 is unseated from movable wall 6 to valve the supply into chamber B when unseated by tubular element 13.

In the second relay 16, plug element 21 is unseated by tubular element 22 as it extends through passage 20. The movement of element 22 is controlled by the movable wall 19 as the wall moves under the differential pressures of chambers C and D.

Element 22 is connected to wall 19. As this element disconnects from plug 12 it connects chamber D to exhaust. As element 22 engages plug 21, and unseats the plug, the supply pressure is connected to chamber D. The output passage 23 conducts the pressures generated in chamber D to that control device which ultimately affects the positioning of primary element 1.

OPERATION OF THE SYSTEM

Now we can return to that output pressure generated in chamber B of the first relay. In FIG. 1 that pressure is placed beneath wall 19. Wall 19 moves element 22 to unseat plug 21. The pressure fluid of the supply flows into chamber D more quickly through passage 20 than across the seat of plug 11 in the first relay.

Figure 2:
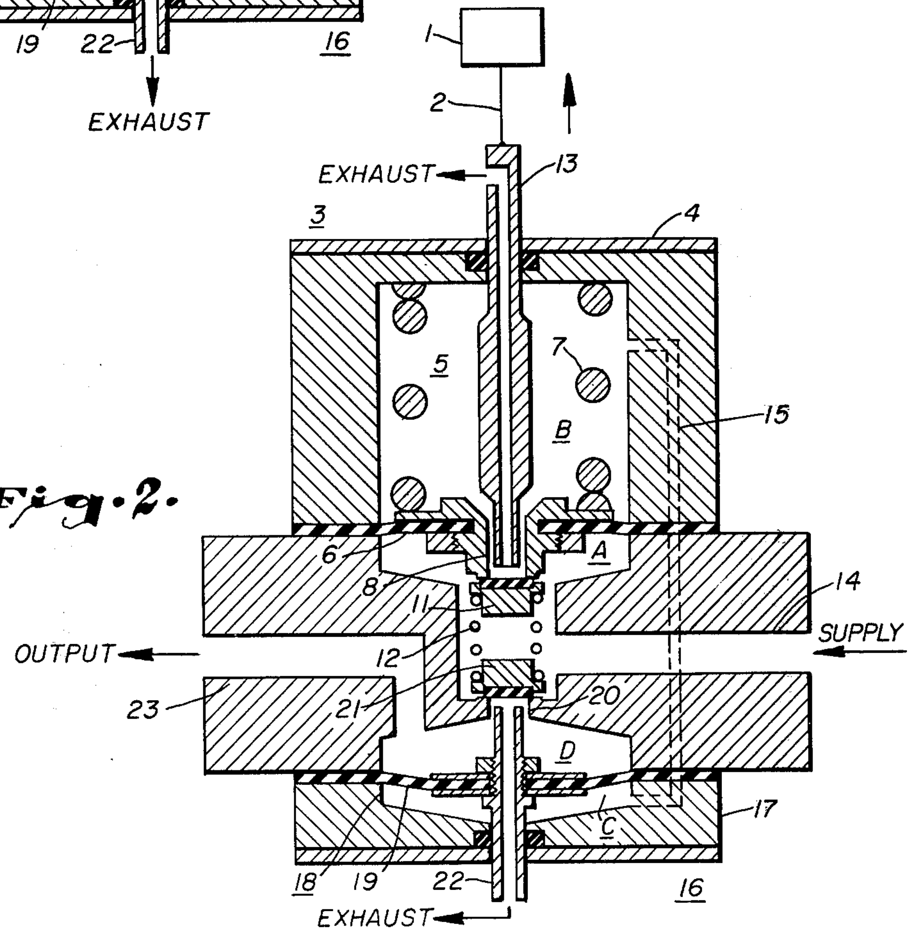
FIG. 2 is similar to FIG. 1 but with the relay system connected to the primary element so as to decrease the output pressure of the system.

FIG. 2 discloses the first relay, actuated by the primary element, unseating the end opening of tubular element 13 from plug element 11 while plug element 11 remains seated on seat 9. The central passage of tubular element 13 is vented to exhaust, external of the relay. Therefore unseating the open end of tubular element 13 from plug 11 vents chamber B. The result is a reduction of the pressure in chamber B, a subtraction of the force of chamber B from the combined force of spring 7 and the chamber B pressure. Wall 6 and plug element 11 then move toward reseating of the open end of tubular element 13 on plug element 11. At the second new position of tubular element 13 and primary element 1, the output of chamber B has a lower fluid pressure value representative of the second new position.

The second relay of the system follows the function of the first relay in that the reduced pressure of chamber B is connected to chamber C and wall 19 moves tubular element 22 away from its contact with plug 21 to vent chamber D and decrease its pressure. The final result is a decrease of the output pressure of the system, in passage 23, proportional to the decreased pressure of chamber B. Again, it is emphasized that the volume of pressure fluid flow across the seat of plug 21 is much greater than across the seat of plug 11. As disclosed in FIGS. 1, 2 and 3, second relay 16 is a so-called 1 to 1 relay in its relation between its input and output, but its response is with a finite larger volume of pressure fluid than that of the first relay 3. The system has all the sensitivity and desirable minimum wastage of pressure fluids, but, with the second relay, the system has a much greater pressure fluid output than the first relay.

Figure 3:
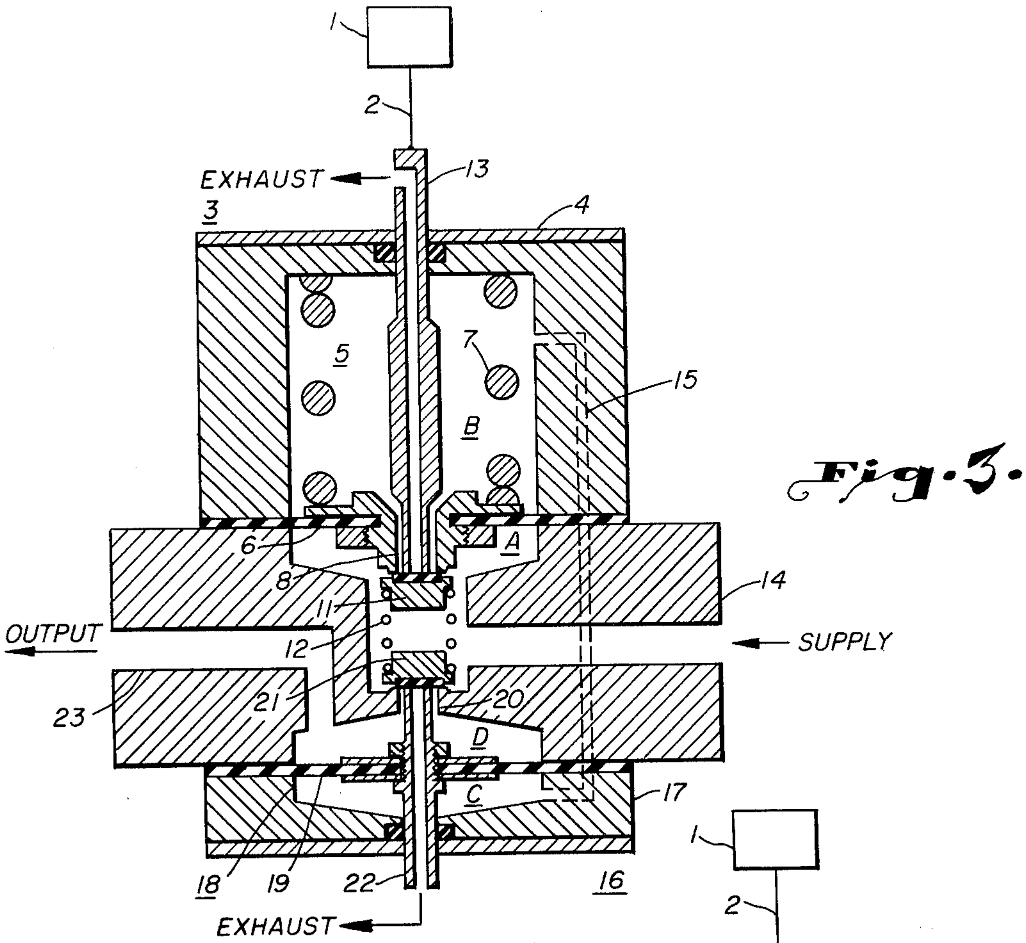
FIG. 3 is similar to the preceding Figures but with the relay system and primary element in their steady state condition.

FIG. 3 discloses the relation between the structures of the relay system after actuation and reseating of the plug elements into engagement with the seats and the open ends of the tubular elements. With a pause in the movement of the tubular elements, the relay system and primary element are in a steady state condition. The primary element is not moving in FIG. 3. Chamber B is sealed from both supply and exhaust, the pressure within chamber B having been generated to the value which will add enough force to that of spring 7, on wall 6 to balance the force of the fluid pressure supply connected to chamber A and whatever small contribution of force is made by spring 12. Chamber D is also sealed from both supply and exhaust, the pressure within chamber D having been generated to the value which will bring the differential forces on wall 19 into balance with the plug 21 on both the seat about passage 20 and the seat over the exhaust passage of element 22.

SECOND FORM FOR BOOSTER RELAY

Figure 4:
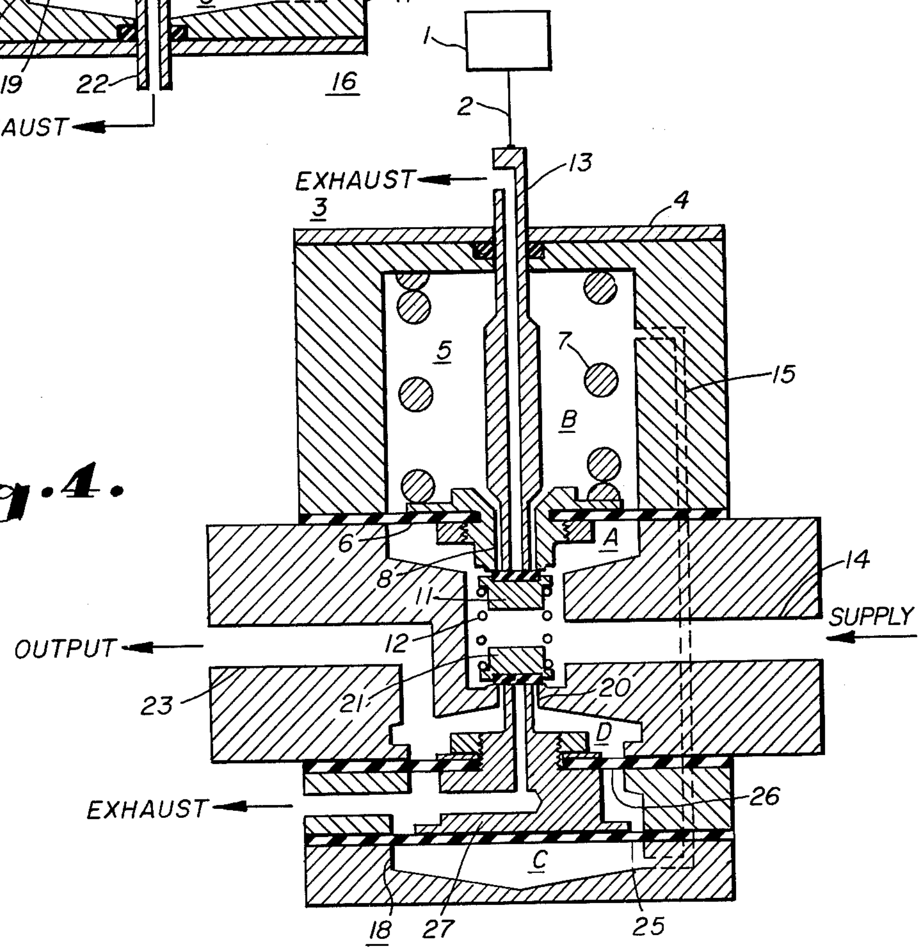
FIG. 4 is similar to the preceding FIGS. but with the second relay having a movable wall system with which the output of the fluid pressure from the second relay is developed at a rate greater than the output rate developed for the fluid pressure from the first relay.

FIG. 4 discloses a form for the second relay which provides a different ratio of fluid pressures in the input and output of the chambers C and D. The 1 to 1 ratio of FIGS. 1, 2 and 3 is satisfactory for many applications. However, a greater rate of change for the output pressure for the system may be required than generated in the chamber B of the first relay. FIG. 4 discloses the movable wall area of chamber C may be greater than the movable wall area of chamber D. With this differential of effective wall areas, the smaller pressure generated in chamber B, and connected to chamber C, will generate a larger pressure in chamber D to return the system to balance.

In FIG. 4, all structures common with the preceding Figures have been given the same numerical designations. Movable wall 19, however, has been replaced with two walls 25 and 26 of different effective areas. The two walls move together because of their common connection with fixture 27, but wall 25 is extended across bore 18 to form chamber C and wall 26 is extended across bore 18 to form chamber D. Wall 25 is larger in effective area than wall 26. Fixture 27 extends its exhaust passage up passage 20 to engage plug element 21, precisely as does tubular element 22 of the FIGS. 1, 2 and 3. The other end of the fixture passage is connected to atmosphere from between wall 25 and 26.

The function of this structure is evident, if not already adequately described. The pressure output generated in chamber D and output passage 23 is a multiple of the input pressure placed in chamber C. The larger effective area of wall 25 requires a larger pressure on wall 26 to balance the fluid pressure on the movable wall assembly of walls 25, 26 and fixture 27 at each position of the primary element 1. Therefore, the relatively small range of pressures of the first relay are in control of the relatively large range of pressures in the output of the second relay.

CONCLUSION

Comparison of the present system with that disclosed in my U.S. Pat. No. 4,052,996, issued Oct. 11, 1977 is encouraged. The concept of that relay are again validated by the present disclosure. At each new position of the primary element, the plug element 11 engages both seat 9 and the open end of tube 13 after the output fluid pressure of chamber B is established. Supply passage 14 is therefore sealed against bleed of power fluid to exhaust. However, the small movements which separate the plug 11 and seat 9 in the valving action limit the quantity of pressure fluid into chamber B. When the comparatively large volumes of control devices are are connected to the output of this system, the response time is severely limited because of the time needed to fill the volumes of the control devices for chamber B. Large volumes of pressure fluid must be provided under control of the primary element.

The present system was conceived to convert the role of the first relay to what may be termed a transducer. The primary element movement actuates the first relay to establish the relatively small "pilot" signal. This pilot signal is then "boosted" by the second relay to provide a proportional signal with the capacity to position large control units. The speed of response of the complete system is equal to the system of my U.S. Pat. No. 4,052,996 and, additionally, it is quantitatively capable of the increased work required by the real world of fluid pressure control units. Finally, this new system, in its balanced state prevents the pressure fluid from constantly bleeding to waste.

In striving for clarity, I must plead guilty to somewhat pedantically wallowing in simplistic phrases which, in a measure, overlap when disclosing the structures which embody the invention. No attempt was made to glamorize the invention with words and phrases which might distract those skilled in the art from understanding the basic simplicity of the invention. There is small choice in the language in this particular art from which to structure robust phrases. There are only limited and simplistic terms such as relay, chamber, pressure fluid, passage, valving, primary element, movable wall and control unit.

Little remains to form an arsenal of dramatic words and phrases with which to select, and form, telling descriptions that ring with the solid advance this invention makes within the art. Therefore, if words of persuasive bite be unavailable, the words selected are clear and definite with which to trace the periphery of the scope of the invention.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A fluid pressure, non-bleed, position valve system, including;

a first relay valve structure having, (a) a housing in which there is a bore, (b) a movable wall within the housing bore and sealed to the walls of the housing bore to divide the housing bore into two chambers, (c) a bore extended through the movable wall and parallel to the path of the movable wall in the housing bore, (d) a seat about the bore through the movable wall and between the chambers on each side of the wall, (e) a plug element positioned to be urged by a spring toward engaging the seat about the bore through the movable wall, (f) a spring mounted within the housing bore chamber which is opposite the plug element to exert its force on the wall in the direction to move the seat of the wall toward the plug element, (g) a supply of pressure fluid connected to the housing bore chamber on the plug element side of the movable wall, (h) an outlet passage for the fluid pressure generated in the housing bore chamber on the side of the movable wall opposite the plug element, (i) and a tube extending its open end into the movable wall bore seat to engage the plug element to first move the plug element from the wall bore seat and next move away from engagement with the plug element to adjust the pressure in the housing bore chamber on the side of the wall opposite the plug element, whereby each position of the tube will generate a differential pressure between the chambers across the movable wall which will move the wall until the plug element engages the seat on the bore through the wall and open end of the tube as a positioner to seal the housing chambers on each side of the wall from each other and the chamber opposite the plug element from exhaust through the tube;

and a second relay valve structure having (a) a housing in which there is a bore, (b) a movable wall within the housing bore and sealed to the walls of the housing bore to divide the housing bore into two chambers, (c) a passage means connecting the outlet passage of the first relay to a first of the two chambers, (d) a passage means connecting the second of the two chambers to the supply of fluid pressure of the first relay, (e) a seat about the passage means to the supply and formed on the end of the passage means connected to the supply, (f) a plug element positioned to be urged by a spring toward engaging the seat, (g) the spring urging the plug element of the first relay also positioned to urge the plug element of the second relay toward seat engagement, (h) a tube connected to the movable wall and extending one end through the passage means connecting the second chamber to supply to engage the plug element to first move the plug element from the seat and next move away from engagement with the plug element to adjust the pressure in the second chamber, whereby each fluid pressure value established in the first chamber by the first relay will establish a differential of pressures across the movable wall and position the tube to supply pressure fluid to the second chamber and exhaust pressure fluid from the second chamber to establish a predetermined ratio between the pressures of the second chambers of the relays when the second chamber of the second relay is sealed from its supply and exhaust, and an output passage for pressure fluid from the second chamber of the second relay adapted to be connected to a control unit to be positioned in relation to the movement of the primary element.

2. The valve system of claim 1, wherein, the housing of the first valve is mounted on the housing of the second valve in an arrangement to provide for the passage means of the second relay which connects the second of the two chambers of the second relay to the housing bore chamber of the first relay which is connected to the supply of pressure fluid.

3. The valve system of claim 1, wherein, the movable wall of the second valve structure comprises:

(a) a first movable wall within the housing bore and sealed to the walls of the housing bore to form the first of the two chambers and is connected to the outlet passage of the first relay, (b) a second movable wall within the housing bore and sealed to the walls of the housing bore to form the second of the two chambers which second chamber is to be connected to the supply of pressure fluid and exhaust, (c) and a fixture positioned between both walls and fixed to both walls as a mount for the tube of the second relay while the movable walls are provided with different effective areas to the pressures generated in their respective chambers.

* * * * *